United States Patent
Chou

(10) Patent No.: US 10,126,845 B2
(45) Date of Patent: Nov. 13, 2018

(54) WIRELESS INPUT DEVICE, CHARGING PAD AND CHARGING METHOD THEREOF

(71) Applicants: DEXIN ELECTRONIC LTD., Donggaun, Guangdong (CN); DEXIN CORPORATION, New Taipei (TW)

(72) Inventor: Pai-Yang Chou, New Taipei (TW)

(73) Assignees: DEXIN ELECTRONIC LTD., Dongguan, Guangdong (CN); DEXIN CORPORATION, New Taipei (TW)

(*) Notice: Subject to any disclaimer, the term of this patent is extended or adjusted under 35 U.S.C. 154(b) by 236 days.

(21) Appl. No.: 15/180,052

(22) Filed: Jun. 12, 2016

(65) Prior Publication Data

US 2017/0357337 A1    Dec. 14, 2017

(51) Int. Cl.
| | |
|---|---|
| *H02J 7/00* | (2006.01) |
| *G06F 3/039* | (2013.01) |
| *H02J 7/02* | (2016.01) |
| *H02J 7/04* | (2006.01) |
| *G06F 3/0354* | (2013.01) |
| *G06F 3/038* | (2013.01) |

(52) U.S. Cl.
CPC ........... *G06F 3/0395* (2013.01); *G06F 3/038* (2013.01); *G06F 3/03543* (2013.01); *H02J 7/0052* (2013.01); *H02J 7/025* (2013.01); *H02J 7/04* (2013.01)

(58) Field of Classification Search
CPC .. H02J 7/0052; H02J 7/025; H02J 7/04; H02J 50/10; H02J 50/80; H02J 50/90
USPC ........................................................ 320/108
See application file for complete search history.

(56) References Cited

U.S. PATENT DOCUMENTS

| | | | |
|---|---|---|---|
| 7,180,503 B2* | 2/2007 | Burr ................. | G06F 1/266 320/108 |
| 2003/0048254 A1* | 3/2003 | Huang ............... | G06F 3/03543 345/163 |
| 2010/0304188 A1* | 12/2010 | Larsen ............... | H01M 2/105 429/1 |
| 2011/0175567 A1* | 7/2011 | Kidakarn ............ | G06F 1/266 320/108 |
| 2014/0327619 A1* | 11/2014 | Chang ................ | G06F 3/03543 345/163 |

(Continued)

*Primary Examiner* — Nathaniel Pelton
(74) *Attorney, Agent, or Firm* — Li & Cai Intellectual Property (USA) Office

(57) ABSTRACT

A wireless input device is provided. The wireless input device includes a rechargeable wireless mouse, a wireless receiver and a charging pad. The charging pad includes a wireless power transmitting module and a charging control circuit. The charging control circuit is electrically connected to the wireless power transmitting module. The charging control circuit correspondingly activates the wireless power transmitting module to wirelessly output the electromagnetic power according to an activation signal provided by the wireless receiver. The charging pad receives the activation signal when the wireless receiver is connected to the charging pad. When the charging pad is not connected to the wireless receiver, the charging control circuit stops the wireless power transmitting module from wirelessly outputting the electromagnetic power. Accordingly, the charging pad of the present invention can avoid damage resulting from the abnormal charging so as to save power.

12 Claims, 6 Drawing Sheets

(56) References Cited

U.S. PATENT DOCUMENTS

| | | | | |
|---|---|---|---|---|
| 2014/0375261 | A1* | 12/2014 | Manova-Elssibony | ............ H02J 7/025 320/108 |
| 2015/0137601 | A1* | 5/2015 | Fujita | ............ H04B 5/0037 307/31 |
| 2015/0229139 | A1* | 8/2015 | Greene | ............ H02J 7/008 320/107 |
| 2015/0326059 | A1* | 11/2015 | Abu Qahouq | ............ H02J 7/007 320/108 |
| 2016/0085322 | A1* | 3/2016 | Park | ............ G06F 1/266 345/163 |
| 2016/0380465 | A1* | 12/2016 | Dow | ............ H02J 7/025 320/108 |

* cited by examiner

WIRELESS INPUT DEVICE, CHARGING PAD AND CHARGING METHOD THEREOF

BACKGROUND

1. Technical Field

The present invention generally relates to an input device and, more particularly, to a wireless input device capable of wirelessly charging a rechargeable wireless mouse, a charging pad and a method thereof.

2. Description of Related Art

A wireless mouse provides the user with ease of operation, however the battery capacity limits the operable time of a wireless mouse. For example, the battery consumption varies with the operable time of a wireless mouse. That is, the operable time of the wireless mouse is related to the power consumption. Recently, a charging dock has been developed for a rechargeable wireless mouse. A rechargeable wireless mouse can be placed on such charging dock and charged by such charging dock through a connector disposed thereon. In brief, this kind of charging dock charges a rechargeable wireless mouse through a wired connection. Moreover, a charging pad has been developed for a rechargeable wireless mouse. A rechargeable wireless mouse can be placed directly on such charging pad and charged by such charging dock through a wireless connection. However, if something other than a rechargeable wireless mouse is placed on the charging pad, the operation of the charging pad will be affected.

SUMMARY

The present invention provides a wireless input device, a charging pad and a charging method thereof, capable of ensuring the normal operation of the charging pad without deteriorating the charging function of the rechargeable wireless mouse.

One aspect of the present invention provides a wireless input device including a rechargeable wireless mouse, a wireless receiver and a charging pad. The charging pad is capable of wirelessly charging the rechargeable wireless mouse. The charging pad further includes a wireless power transmitting module and a charging control circuit. The charging control circuit is electrically connected to the wireless power transmitting module. The charging control circuit correspondingly activates the wireless power transmitting module to wirelessly output the electromagnetic power according to an activation signal provided by the wireless receiver. The charging pad receives the activation signal when the wireless receiver is connected to the charging pad. When the charging pad is not connected to the wireless receiver, the charging control circuit stops the wireless power transmitting module from wirelessly outputting the electromagnetic power.

Another aspect of the present invention provides a charging pad for a wireless receiver and a rechargeable wireless mouse. The charging pad includes a wireless power transmitting module configured to wirelessly charge the rechargeable wireless mouse and a charging control circuit. The charging control circuit is electrically connected to the wireless power transmitting module. The charging control circuit activates the wireless power transmitting module to wirelessly output the electromagnetic power according to an activation signal provided by the wireless receiver. The charging pad receives the activation signal when the wireless receiver is connected to the charging pad. The charging control circuit stops the wireless power transmitting module from wirelessly outputting the electromagnetic power when the charging pad is not connected to the wireless receiver.

Still another aspect of the present invention provides a charging method of a charging pad for a wireless receiver and a rechargeable wireless mouse. The charging method includes the steps herein. A charging control circuit of the charging pad activates a wireless power transmitting module of the charging pad according to an activation signal provided by the wireless receiver to wirelessly output electromagnetic power to charge the rechargeable wireless mouse when the charging pad is connected to the wireless receiver. The charging control circuit stops the wireless power transmitting module from wirelessly outputting the electromagnetic power when the charging pad is not connected to the wireless receiver.

As previously stated, the present invention provides a wireless input device, a charging pad and a charging method thereof. The wireless charging function of the charging pad is activated when the wireless receiver is connected to the charging pad. Thereby, when the charging pad is not connected to the wireless receiver, the charging pad can automatically stop wirelessly charging the rechargeable wireless mouse. Accordingly, the charging pad of the present invention can avoid damage resulting from abnormal charging so as to save power.

In order to further understand the techniques, means and effects of the present invention, the following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

The detailed description set forth below in connection with the appended drawings is intended as a description of certain embodiments of the present invention, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present invention.

The present invention provides a wireless input device. The wireless input device, for example, includes a wireless receiver, a charging pad and a rechargeable wireless mouse. The charging pad can wirelessly charge the rechargeable wireless mouse, and the charging pad may selectively activate or stop the wireless charging function according to practical demands. For example, the charging pad activates the wireless charging function when the charging pad is connected to the wireless receiver and the charging pad stops the wireless charging function when the charging pad is not connected to the wireless receiver.

When the charging pad is connected to the wireless receiver, the charging pad may further determine whether the rechargeable wireless mouse is placed thereon. For example, when the rechargeable wireless mouse is placed on the charging pad, the charging pad enters a working mode to charge the rechargeable wireless mouse. When the rechargeable wireless mouse is not placed on the charging pad, the charging pad enters an energy-saving mode so as to prevent the charging pad from being damaged for wirelessly charging any metallic product other than the rechargeable wireless mouse for a long time.

[Embodiment of Wireless Input Device]

Figure 1:
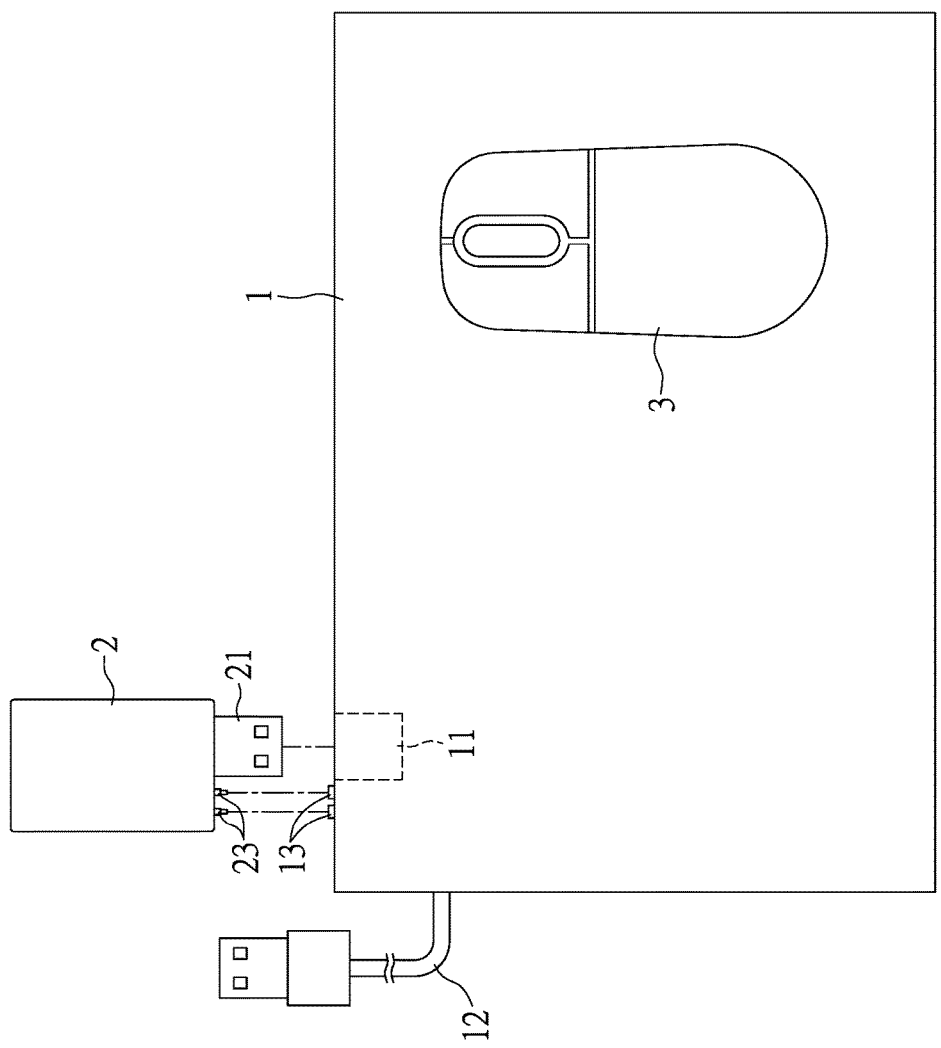
FIG. 1 is a schematic diagram of a wireless input device according to one embodiment of the present invention.

Referring to FIG. 1, FIG. 1 is a schematic diagram of a wireless input device according to one embodiment of the present invention. In the present embodiment, the wireless input device includes a charging pad 1, a wireless receiver 2 and a rechargeable wireless mouse 3. The wireless receiver 2 can be connected to the charging pad 1, and the wireless receiver 2 can, for example, output an activation signal, a working signal or an operation signal to the charging pad 1. The charging pad 1 can receive the signal outputted by the wireless receiver 2, and wirelessly charge the rechargeable wireless mouse 3. Moreover, the charging pad 1 includes a transmission line 12. The transmission line 12 is, for example, a USB transmission line capable of being connected to a computer device (not shown) so that the charging pad 1 can acquire power from the computer device. Moreover, the charging pad 1 can transmit an operation signal outputted to the wireless receiver 2 by the rechargeable wireless mouse 3 to the computer device. The rechargeable wireless mouse 3 can, for example, wirelessly output a charging signal or an operation signal to the wireless receiver 2. Here, the wireless receiver 2 and the rechargeable wireless mouse 3 are operable even when the wireless receiver 2 and the charging pad 1 are not interconnected. For example, when the user plugs the wireless receiver 2 into the host computer, the rechargeable wireless mouse 3 becomes operable even though the charging pad 1 is unavailable.

In one embodiment, the interconnection between the wireless receiver 2 and the charging pad 1 can be described as follows. The charging pad 1 includes a receptacle portion 11 and a first contact interface 13. The wireless receiver 2 includes a plug portion 21 and a second contact interface 23. The wireless receiver 2 can be connected to the charging pad 1 by plugging the plug portion 21 into the receptacle portion 11 of the charging pad 1. When the wireless receiver 2 and the charging pad 1 are connected as stated above, the first contact interface 13 of the charging pad 1 electrically contacts the second contact interface 23 of the wireless receiver 2. However, in FIG. 1, the relation between the first contact interface 13 and the second contact interface 23 only exemplifies the present embodiment and is not intended to limit the present invention. The first contact interface 13 electrically contacts the second contact interface 23 as long as the wireless receiver 2 is connected to the charging pad 1. Moreover, the plug portion 21 and the receptacle portion 11 are, for example, USB connectors complying with USB standard. The first contact interface 13 and the second contact interface 23 comply with, for example, the inter-integrated circuit (I2C) protocol, the serial peripheral interface (SPI) bus or the universal asynchronous receiver transmitter (UART) protocol. In one embodiment, the first contact interface 13 can be, for example, a compression connector, and the second contact interface 23 can be, for example, a pogo-pin connector, to which the present invention is not limited.

Furthermore, the charging pad 1 determines whether the wireless receiver 2 is connected to the charging pad 1 by determining whether the activation signal outputted by the wireless receiver 2 is received. For example, when the charging pad 1 receives the activation signal, it indicates that the wireless receiver 2 has been connected to the charging pad 1. Meanwhile, the charging pad 1 can activate the wireless charging function to charge the rechargeable wireless mouse 3 placed on the charging pad 1. On the contrary, when the charging pad 1 does not receive the activation signal, it indicates that the wireless receiver 2 is not connected to the charging pad 1. Meanwhile, the charging pad 1 can stop wirelessly charging the rechargeable wireless mouse 3 so as to save power and protect the charging pad 1 from being damaged.

In one embodiment, when the wireless receiver 2 has been connected to the charging pad 1 and the rechargeable wireless mouse 3 is not placed on the charging pad 1, the charging pad 1 wirelessly charges the rechargeable wireless mouse 3 in an energy-saving mode. The energy-saving mode indicates that the charging pad 1 intermittently outputs the electromagnetic power wirelessly. For example, the charging pad 1 outputs the electromagnetic power for a time period (for example, 1 second) and stops outputting the electromagnetic power for a time period (for example, 1 second) alternatively, to which the present invention is not limited. When the wireless receiver 2 is connected to the charging pad 1 and the rechargeable wireless mouse 3 is placed on the charging pad 1, the charging pad 1 wirelessly charges the rechargeable wireless mouse 3 in a working mode. The working mode indicates that the charging pad 1 continuously outputs the electromagnetic power wirelessly In one embodiment, the charging pad 1 determines whether the rechargeable wireless mouse 3 is placed thereon by determining whether a working signal outputted by the wireless receiver 2 is received. For example, when the rechargeable wireless mouse 3 is placed on the charging pad 1 for charging, the rechargeable wireless mouse 3 correspondingly outputs a charging signal to the wireless receiver 2 according to the electromagnetic power provided by the charging pad 1. When the wireless receiver 2 receives the charging signal, the wireless receiver 2 outputs a working signal to the charging pad 1. When the charging pad 1 receives the working signal, it indicates that the rechargeable wireless mouse 3 has been placed on the charging pad 1. When the charging pad 1 does not receive the working signal, it indicates that the rechargeable wireless mouse 3 is not placed on the charging pad 1.

Figure 2:
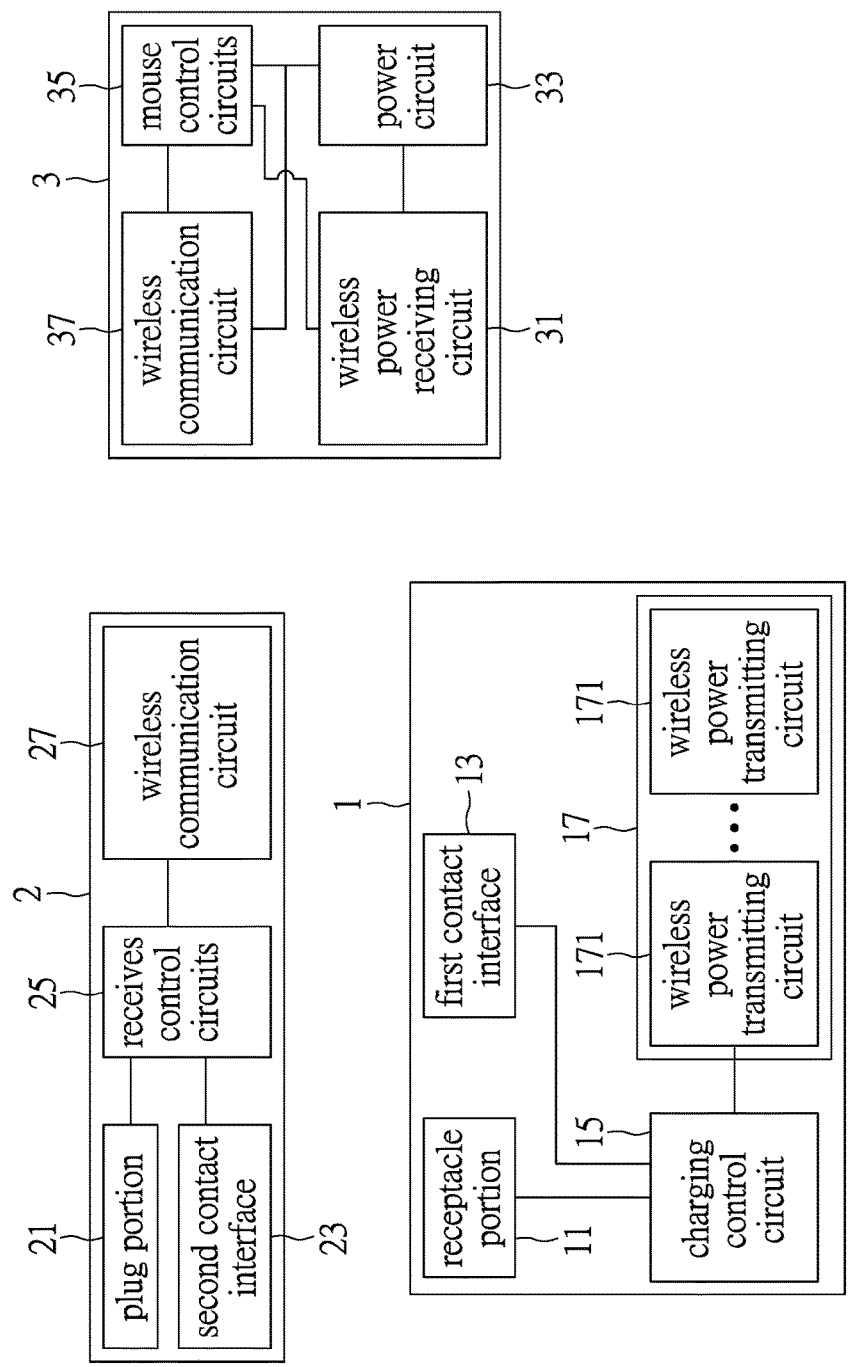
FIG. 2 is a functional block diagram of a wireless input device according to one embodiment of the present invention.

Referring to FIG. 2, FIG. 2 is a functional block diagram of a wireless input device according to one embodiment of the present invention. Referring to FIG. 1 and FIG. 2, the wireless receiver 2 includes, for example, a plug portion 21, a second contact interface 23, a receiver control circuit 25 and a wireless communication circuit 27. The receiver control circuit 25 is electrically connected to the plug portion 21, the second contact interface 23 and the wireless communication circuit 27. The charging pad 1 includes, for example, a receptacle portion 11, a first contact interface 13, a charging control circuit 15 and a wireless power transmitting module 17. The charging control circuit 15 is electrically connected to the receptacle portion 11, the first contact interface 13 and the wireless power transmitting module 17. In one embodiment, the wireless power transmitting module 17 further includes at least one wireless power transmitting circuit 171. The number of wireless power transmitting circuits 171 is determined according to the actual area size of the charging pad 1. The present invention is not limited to the number of the wireless power transmitting circuits 171. The rechargeable wireless mouse 3 includes, for example, a wireless power receiving circuit 31, a power circuit 33, a mouse control circuit 35 and a wireless communication circuit 37. The power circuit 33 is electrically connected to the wireless power receiving circuit 31, the mouse control circuit 35 and the wireless communication circuit 37. The mouse control circuit 35 is electrically connected to the wireless communication circuit 37 and the wireless power receiving circuit 31.

The charging control circuit 15 of the charging pad 1 receives the activation signal and the working signal outputted by the wireless receiver 2 through the first contact interface 13, and receives the operation signal outputted by the wireless receiver 2 through the receptacle portion 11. The receptacle portion 11 is further electrically connected to the transmission line 12. For example, when the wireless receiver 2 is connected to the charging pad 1 and the rechargeable wireless mouse 3 is not placed on the charging pad 1, the charging control circuit 15 receives the activation signal through the first contact interface 13, and the charging control circuit 15 activates the wireless power transmitting module 17. For example, the charging control circuit 15 controls the wireless power transmitting module 17 to wirelessly output the electromagnetic power in an energy-saving mode. Meanwhile, the wireless power transmitting module 17 intermittently outputs the electromagnetic power wirelessly. The charging control circuit 15 may use the receptacle portion 11 to acquire power provided by a computer device through the transmission line 12.

Similarly, the wireless receiver 2 connected to the charging pad 1 may use the receptacle portion 11 to acquire power provided by a computer device through the transmission line 12.

When the wireless receiver 2 is connected to the charging pad 1 and the rechargeable wireless mouse 3 is placed on the charging pad 1, the charging control circuit 15 receives both the working signal and the activation signal through the first contact interface 13. The charging control circuit 15 correspondingly controls the wireless power transmitting module 17 according to the received working signal to wirelessly output the electromagnetic power in a working mode. Meanwhile, the wireless power transmitting module 17 continuously outputs the electromagnetic power wirelessly to charge the rechargeable wireless mouse 3 until the charging control circuit 15 stops receiving the working signal. When the rechargeable wireless mouse 3 is not placed on the charging pad 1, the charging pad 1 switches to the energy-saving mode. Accordingly, when the wireless receiver 2 is connected to the charging pad 1, the charging control circuit 15 correspondingly switches the wireless power transmitting module 17 to the energy-saving mode or the working mode according to whether the rechargeable wireless mouse 3 is placed on the charging pad 1. When the wireless receiver 2 is connected to the charging pad 1, the charging pad 1 may receive through the receptacle portion 11 an operation signal outputted by the wireless receiver 2, and the charging pad 1 may also transmit the operation signal to the computer device through transmission line 12.

When the wireless receiver 2 is not connected to the charging pad 1 and the charging control circuit 15 of the charging pad 1 cannot receive the activation signal through the first contact interface 13, the charging pad 1 stops wirelessly charging the rechargeable wireless mouse 3. More particularly, the charging control circuit 15 controls the wireless power transmitting module 17 to stop outputting the electromagnetic power.

In one embodiment, when the rechargeable wireless mouse 3 is placed on the charging pad 1, the wireless power receiving circuit 31 of the rechargeable wireless mouse 3 may wirelessly receive the electromagnetic power outputted by the charging pad 1 through wireless power transmitting module 17. The power circuit 33 of the rechargeable wireless mouse 3 processes the electromagnetic power received by the wireless power receiving circuit 31 to supply DC power to the internal circuit of the rechargeable wireless mouse 1. For example, the DC power outputted by the power circuit 33 can be supplied to the wireless communication circuit 37 and the mouse control circuit 35. The power circuit 33 includes, but is not limited to, a power conversion circuit, a charging circuit and a rechargeable battery. Implementations of the wireless power transmitting module 17, the wireless power receiving circuit 31 and the power circuit 33 are known to persons with ordinary skill in the art, and thus descriptions thereof are not repeated. The mouse control circuit 35 includes, but is not limited to, a microprocessor, a displacement detection circuit and a keying circuit. The mouse control circuit 35 is configured to provide the wireless communication circuit 37 with an operation signal according to the movement of the rechargeable wireless mouse 3 or key operation. The operation signal is, for example, a cursor movement signal or a key signal. The operation signal is outputted to the wireless receiver 2 through the wireless communication circuit 37.

It should be noted that the mouse control circuit 35 further determines whether the electromagnetic power outputted by the charging pad 1 is received by the wireless power receiving circuit 31 and determines whether to output a charging signal to the wireless receiver 2. For example, when the wireless power receiving circuit 31 receives the electromagnetic power, the mouse control circuit 35 outputs the charging signal to the wireless receiver 2 through the wireless communication circuit 37. When the wireless power receiving circuit 31 does not receive the electromagnetic power, the mouse control circuit 35 does not output the charging signal to the wireless receiver 2 through the wireless communication circuit 37. In other words, considering that the charging pad 1 outputs the electromagnetic power in the energy-saving mode, if the rechargeable wireless mouse 3 is placed on the charging pad 1 and can receive the electromagnetic power outputted by the charging pad 1, and if the rechargeable wireless mouse 3 can output the charging signal to the wireless receiver 2 so that the wireless receiver 2 outputs a working signal to the charging pad 1, the charging pad 1 can switch from the energy-saving mode to the working mode and the rechargeable wireless mouse 3 can stably acquire the electromagnetic power outputted by the charging pad 1.

In one embodiment, the receiver control circuit 25 of the wireless receiver 2 wirelessly receives through the wireless communication circuit 27 the operation signal or the charging signal outputted by the rechargeable wireless mouse 3. For example, when the receiver control circuit 25 receives the operation signal through the wireless communication circuit 27, the receiver control circuit 25 outputs, through the plug portion 21, the operation signal to the receptacle portion 11 of the charging pad 1 through the plug portion 21. When the receiver control circuit 25 receives the charging signal through the wireless communication circuit 27, the receiver control circuit 25 correspondingly outputs the working signal to the first contact interface 13 of the charging pad 1 through the second contact interface 23 according to the charging signal. Moreover, the receiver control circuit 25 may also output the activation signal to the first contact interface 13 of the charging pad 1 through the second contact interface 23. The time the receiver control circuit 25 outputs the activation signal is, for example, when the plug portion 21 is plugged into the receptacle portion 11 to acquire power. Alternatively, the receiver control circuit 25 may also output the activation signal when detecting that the second contact interface 23 contacts the first contact interface 13 after the plug portion 21 is plugged into the receptacle portion 11 to acquire power. The present invention is not limited thereto. Moreover, the wireless transmission technology used by the wireless communication circuit 27 and the wireless communication circuit 37 may include, for example, radio frequency (RF) or Blue-tooth transmission. The receiver control circuit 25 can be, for example, a controller or a processor that includes processing circuitry.

[Embodiment of Charging Pad Charging Method]

Figure 3:
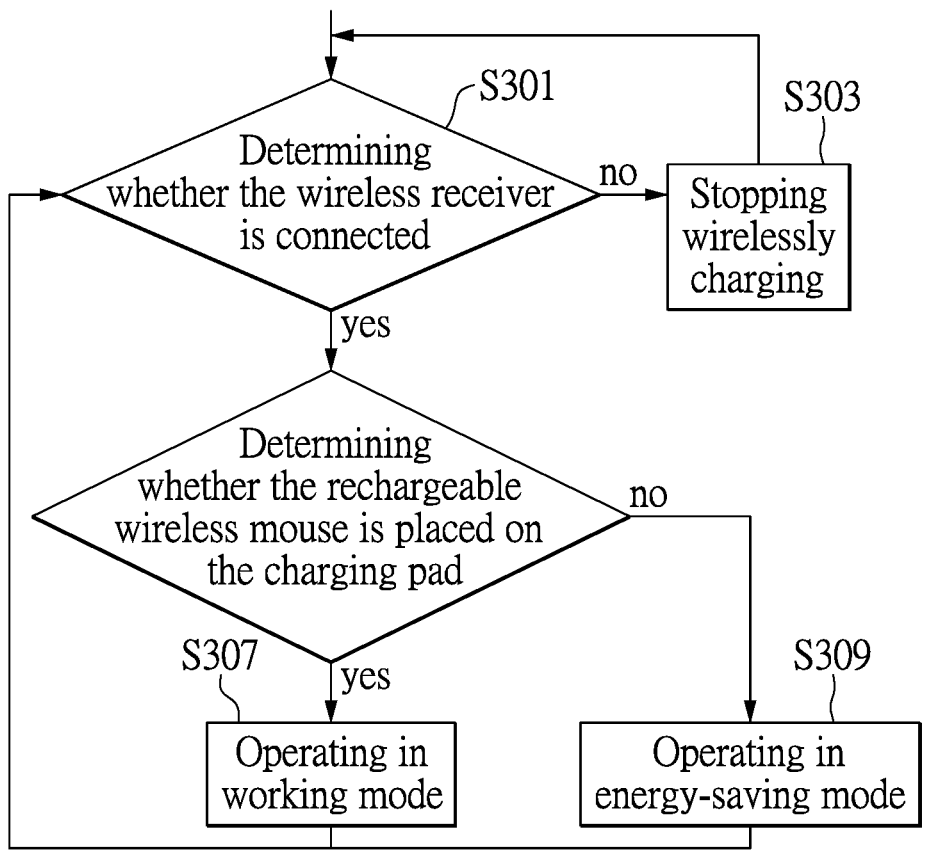
FIG. 3 is a flowchart for charging by a charging pad according to one embodiment of the present invention.

Referring to FIG. 3, FIG. 3 is a flowchart for charging by a charging pad according to one embodiment of the present invention. Please also refer to both FIG. 1 and FIG. 2. In the present embodiment, the charging method of the charging pad 1 is exemplified by the wireless input device as shown in FIG. 1 and FIG. 2, to which the present invention is not limited. The flowchart of the charging method in FIG. 3 includes the steps as follows.

First, in Step S301, the charging pad 1 determines whether the wireless receiver 2 is connected. In one embodiment, the charging pad 1 determines whether an activation signal outputted by the wireless receiver 2 is received. If the charging pad 1 has received the activation signal, the charging pad 1 determines that the wireless receiver 2 is connected. On the contrary, if the charging pad 1 has not received the activation signal, the charging pad 1 determines that the wireless receiver 2 is not connected.

When Step S301 determines that the wireless receiver 2 is not connected, Step S303 is conducted such that the charging pad 1 stops wirelessly charging. The wireless power transmitting module 17 of the charging pad 1 stops outputting the electromagnetic power. If the rechargeable wireless mouse 3 is placed on the charging pad 1 at this moment, the rechargeable wireless mouse 3 cannot be wirelessly charged.

When Step S301 determines that the wireless receiver 2 is connected, Step S305 is conducted to determine whether the rechargeable wireless mouse 3 is placed on the charging pad 1. In one embodiment, the charging pad 1 determines whether the working signal outputted by the wireless receiver 2 has been received. If the charging pad 1 has received the working signal, the rechargeable wireless mouse 3 is determined to have been placed on the charging pad 1. On the contrary, if the charging pad 1 has not received the working signal, the rechargeable wireless mouse 3 is determined to have not been placed on the charging pad 1. When Step S305 determines that the rechargeable wireless mouse 3 is placed on the charging pad 1, Step S307 is then conducted to operate the charging pad 1 in a working mode, indicating that the charging pad 1 continuously outputs the electromagnetic power wirelessly to charge the rechargeable wireless mouse 3.

When Step S305 determines that the rechargeable wireless mouse 3 has not been placed on the charging pad 1, Step S309 is then conducted to operate the charging pad 1 in an energy-saving mode, indicating that the charging pad 1 intermittently outputs the electromagnetic power wirelessly.

[Embodiment of Control Method of Wireless Receiver]

Figure 4:
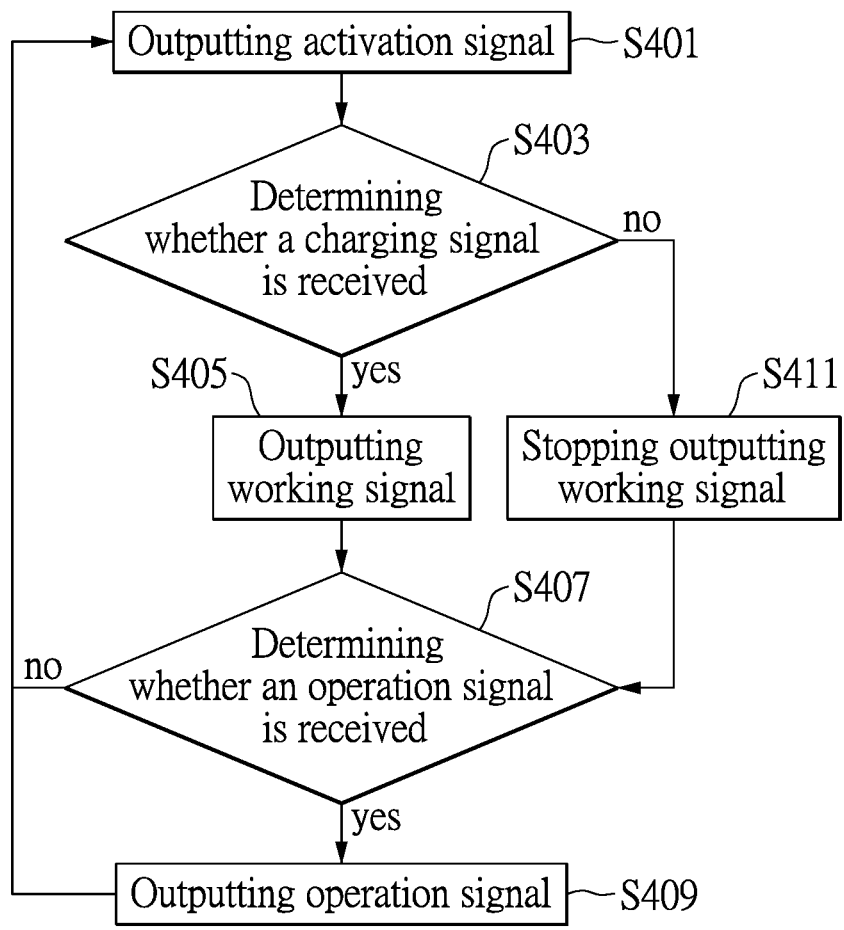
FIG. 4 is a flowchart for controlling a wireless receiver according to one embodiment of the present invention.

Referring to FIG. 4, FIG. 4 is a flowchart for controlling a wireless receiver according to one embodiment of the present invention. Please also refer to FIG. 1 and FIG. 2. In the present embodiment, the control method of the wireless receiver 2 is exemplified by the wireless input device as shown in FIG. 1 and FIG. 2, to which the present invention is not limited. The flowchart of the charging method in FIG. 4 includes the following steps.

In Step S401, when the wireless receiver 2 is connected to the charging pad 1, the wireless receiver 2 outputs an activation signal to the charging pad 1. In other words, the charging pad 1 can activate the wireless charging function of the charging pad 1 through a received activation signal.

In Step S403, the wireless receiver 2 determines whether a charging signal has been received. In one embodiment, the charging signal is outputted by the rechargeable wireless mouse 3 to the wireless receiver 2 when the rechargeable wireless mouse 3 is placed on the charging pad 1.

When Step S403 determines that a charging signal has been received, Step S405 is conducted so that the wireless receiver 2 outputs a working signal to the charging pad 1. The charging pad 1 enters a working mode according to the working signal.

When step S403 determines that a charging signal has not been received, Step S411 is conducted so that the wireless receiver 2 stops outputting the working signal to the charging pad 1. The charging pad 1 enters an energy-saving mode.

In Step S407, the wireless receiver 2 determines whether an operation signal outputted by the rechargeable wireless mouse 3 has been received.

When Step S407 determines that an operation signal has been received, Step S409 is conducted so that the wireless receiver 2 outputs the operation signal to the charging pad 1. The charging pad 1 transmits the operation signal through the transmission line 12 to the computer device.

[Embodiment of Control Method of Rechargeable Wireless Mouse]

Figure 5:
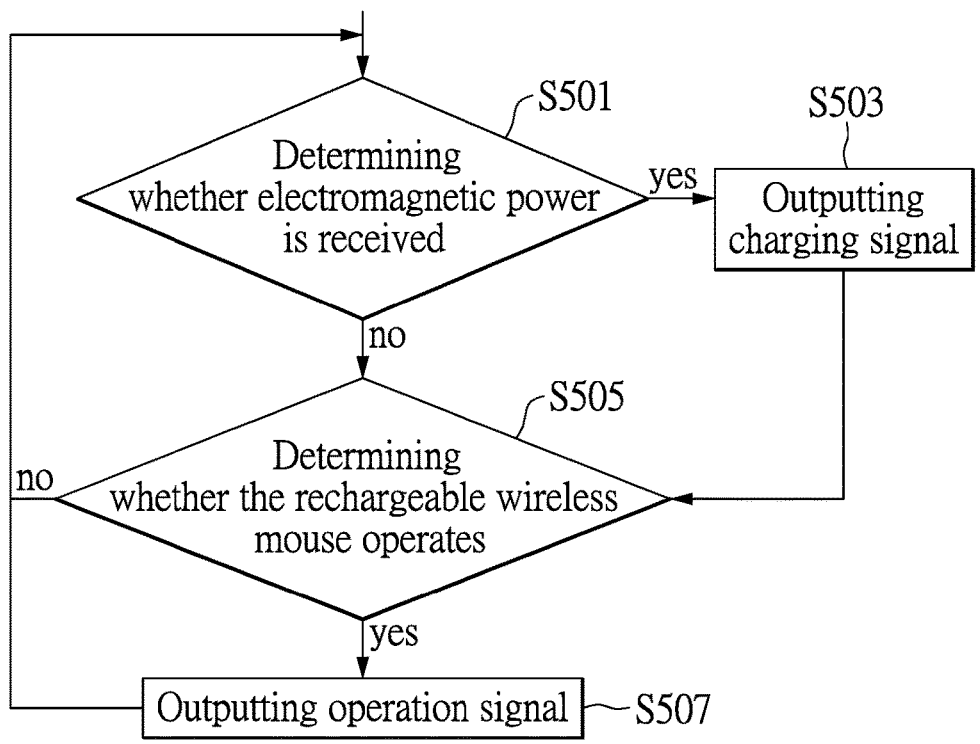
FIG. 5 is a flowchart for controlling a rechargeable wireless mouse according to one embodiment of the present invention.

Referring to FIG. 5, FIG. 5 is a flowchart for controlling a rechargeable wireless mouse according to one embodiment of the present invention. Please also refer to FIG. 1 and FIG. 2. In the present embodiment, the control method of the rechargeable wireless mouse 3 is exemplified by the wireless input device as shown in FIG. 1 and FIG. 2, to which the present invention is not limited. The flowchart of the charging method in FIG. 5 includes the steps as follows.

In Step S501, the wireless receiver 2 determines whether the rechargeable wireless mouse 3 has received the electromagnetic power. In one embodiment, when the charging pad 1 is connected to the wireless receiver 2, the rechargeable wireless mouse 3 receives the electromagnetic power outputted by the charging pad 1 if the rechargeable wireless mouse 3 is placed on the charging pad 1.

When Step S501 determines that the rechargeable wireless mouse 3 has received the electromagnetic power, Step S503 is conducted so that the rechargeable wireless mouse 3 outputs a charging signal to the wireless receiver 2.

When Step S501 determines that the rechargeable wireless mouse 3 has not received the electromagnetic power, Step S505 is conducted to determine whether the rechargeable wireless mouse 3 is being operated. In one embodiment, the operation means movement or clicks of the rechargeable wireless mouse 3.

When Step S505 determines that the rechargeable wireless mouse 3 is not being operated, Step S501 is then conducted.

When Step S505 determines that the rechargeable wireless mouse 3 is operated, Step S507 is then conducted so that the rechargeable wireless mouse 3 outputs an operation signal to the wireless receiver 2.

[Embodiment of Operating Method of Wireless Input Device]

Figure 6:
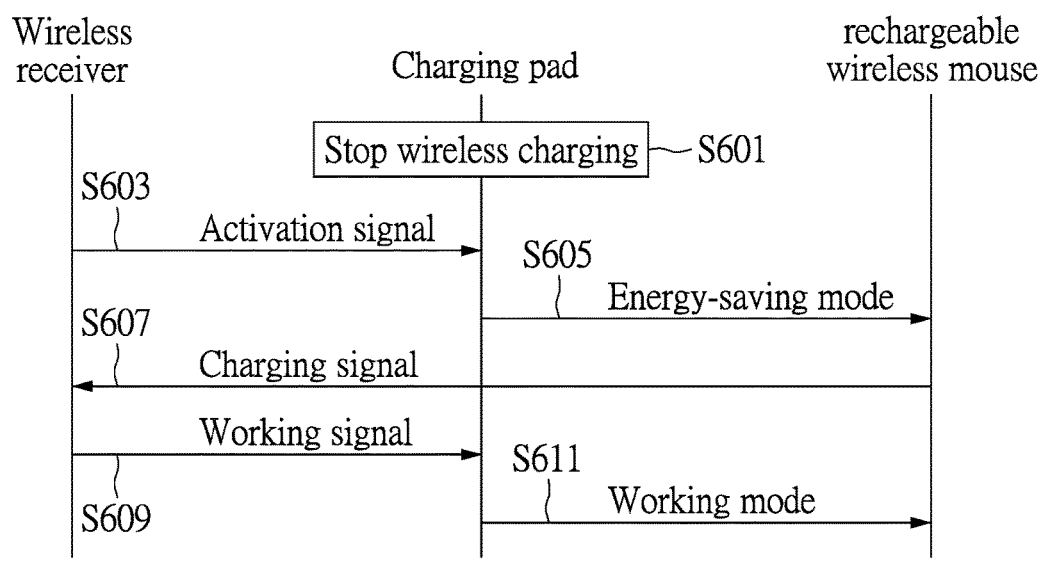
FIG. 6 is a flowchart for operating a wireless input device according to one embodiment of the present invention.

Referring to FIG. 6, FIG. 6 is a flowchart for operating a wireless input device according to one embodiment of the present invention. Please also refer to FIG. 1 and FIG. 2. In the present embodiment, the control method of the wireless input device is exemplified by the wireless input device as shown in FIG. 1 and FIG. 2, to which the present invention is not limited. The flowchart of the charging method in FIG. 6 includes the steps below.

First, in Step S601, when the wireless receiver 2 is not connected to the charging pad 1, the charging pad 1 stops the wireless charging function.

In Step S603, when the wireless receiver 2 is connected to the charging pad 1, the charging pad 1 receives an activation signal outputted by the wireless receiver 2.

In Step S605, the charging pad 1 enters an energy-saving mode according to the activation signal. In one embodiment, the energy-saving mode indicates that the charging pad 1 intermittently outputs the electromagnetic power wirelessly when the rechargeable wireless mouse 3 is not placed on the charging pad 1.

In Step S607, the rechargeable wireless mouse 3 outputs a charging signal to the wireless receiver 2 when the rechargeable wireless mouse 3 is placed on charging pad 1.

In Step S609, the wireless receiver 2 outputs a working signal to the charging pad 1 when the wireless receiver 2 receives the charging signal.

In Step S611, the charging pad 1 enters a working mode according to the working signal. In one embodiment, the working mode indicates that the charging pad 1 continuously outputs the electromagnetic power wirelessly to charge the rechargeable wireless mouse 3 when the rechargeable wireless mouse 3 is placed on the charging pad 1.

[Functions of Embodiments]

As previously stated, the present invention provides a wireless input device, a charging pad and a charging method thereof. The wireless charging function provided by the charging pad is activated when the wireless receiver is connected to the charging pad. The charging pad may further determine whether a rechargeable wireless mouse is placed on the charging pad to decide to enter an energy-saving mode or a working mode. Thereby, when the charging pad is not connected to the wireless receiver, the charging pad can automatically stop wirelessly charging the rechargeable wireless mouse. Accordingly, the charging pad of the present invention can avoid damage resulting from the abnormal charging so as to save power.

The above-mentioned descriptions represent merely the exemplary embodiment of the present invention, without any intention to limit the scope of the present invention thereto. Various equivalent changes, alterations or modifications based on the claims of present invention are all consequently viewed as being embraced by the scope of the present invention.

What is claimed is:

1. A wireless input device, comprising:
a rechargeable wireless mouse;
a wireless receiver; and
a charging pad configured to wirelessly charge said rechargeable wireless mouse, comprising:
 a wireless power transmitting module;
 a charging control circuit electrically connected to said wireless power transmitting module, said charging control circuit activating said wireless power transmitting module to wirelessly output an electromagnetic power according to an activation signal provided by said wireless receiver;
wherein said charging pad receives said activation signal when said wireless receiver is connected to said charging pad, and said charging control circuit stops said wireless power transmitting module from wirelessly outputting the electromagnetic power when said charging pad is not connected to said wireless receiver;
wherein when the rechargeable wireless mouse is placed on the charging pad, the rechargeable wireless mouse outputs a charging signal to the wireless receiver, and the wireless receiver outputs a working signal to the charging control circuit according to the charging signal;
wherein when the wireless receiver is connected to the charging pad and the charging control circuit determines that the rechargeable wireless mouse is not placed on the charging pad in response to receiving none of the working signal, the charging control circuit controls the wireless power transmitting module to intermittently output the electromagnetic power wirelessly such that the charging pad charges the rechargeable wireless mouse in an energy-saving mode;
wherein when the wireless receiver is connected to the charging pad and the charging control circuit determines that the rechargeable wireless mouse is placed on the charging pad in response to receiving the working signal, the charging control circuit controls the wireless power transmitting module to continuously output the electromagnetic power wirelessly such that the charging pad charges the rechargeable wireless mouse in a working mode.

2. The wireless input device of claim 1, wherein said charging pad comprises a first contact interface, said wireless receiver comprises a second contact interface, said first contact interface contacts said second contact interface, and said charging control circuit receives through said first contact interface said activation signal outputted by said wireless receiver through said second contact interface when said wireless receiver is connected to said charging pad.

3. The wireless input device of claim 2, wherein said first contact interface is a compression connector, and said second contact interface is a pogo-pin connector.

4. The wireless input device of claim 2, wherein said wireless receiver comprises a plug portion and said charging pad comprises a receptacle portion, said wireless receiver being connected to said charging pad by plugging into said receptacle portion through said plug portion, and said receptacle portion being electrically connected to a transmission line.

5. The wireless input device of claim 4, wherein said wireless receiver wirelessly receives an operation signal of said rechargeable wireless mouse and transmits said operation signal to said charging pad through said plug portion, and said charging pad receives said operation signal through said receptacle portion and transmits said operation signal to a host computer through said transmission line.

6. The wireless input device of claim 1, wherein said charging pad comprises a first contact interface, said wireless receiver comprises a second contact interface, said wireless receiver outputs the working signal through said second contact interface when said wireless receiver receives the charging signal outputted by said rechargeable wireless mouse, and said charging control circuit controls said wireless power transmitting module to switch from said energy-saving mode to said working mode when said charging control circuit receives said working signal through said first contact interface from said second contact interface of said wireless receiver.

7. The wireless input device of claim 6, wherein said rechargeable wireless mouse wireless outputs said charging signal when said rechargeable wireless mouse receives the electromagnetic power wirelessly outputted by said charging pad, and said charging control circuit activates said wireless power transmitting module to wirelessly output the electromagnetic power in said energy-saving mode when said charging control circuit does not receive said working signal.

8. A charging pad for a wireless receiver and a rechargeable wireless mouse, comprising:
  a wireless power transmitting module configured to wirelessly charge said rechargeable wireless mouse; and
  a charging control circuit electrically connected to said wireless power transmitting module, said charging control circuit activating said wireless power transmitting module to wirelessly output an electromagnetic power according to an activation signal provided by said wireless receiver;
  wherein said charging pad receives said activation signal when said wireless receiver is connected to said charging pad, and said charging control circuit stops said wireless power transmitting module from wirelessly outputting the electromagnetic power when said charging pad is not connected to said wireless receiver;
  wherein when the rechargeable wireless mouse is placed on the charging pad, the rechargeable wireless mouse outputs a charging signal to the wireless receiver, and the wireless receiver outputs a working signal to the charging control circuit according to the charging signal;
  wherein when the wireless receiver is connected to the charging pad and the charging control circuit determines that the rechargeable wireless mouse is not placed on the charging pad in response to receiving none of the working signal, the charging control circuit controls the wireless power transmitting module to intermittently output the electromagnetic power wirelessly such that the charging pad charges the rechargeable wireless mouse in an energy-saving mode;
  wherein when the wireless receiver is connected to the charging pad and the charging control circuit determines that the rechargeable wireless mouse is placed on the charging pad in response to receiving the working signal, the charging control circuit controls the wireless power transmitting module to continuously output the electromagnetic power wirelessly such that the charging pad charges the rechargeable wireless mouse in a working mode.

9. The charging pad of claim 8, wherein said charging pad comprises a first contact interface, said first contact interface contacts a second contact interface of said wireless receiver, and said charging control circuit receives through said first contact interface said activation signal outputted by said rechargeable wireless mouse through said second contact interface when said wireless receiver is connected to said charging pad.

10. The charging pad of claim 8, wherein said wireless receiver outputs the working signal through said second contact interface when said wireless receiver receives the charging signal outputted by said rechargeable wireless mouse, and said charging control circuit controls said wireless power transmitting module to switch from said energy-saving mode to said working mode when said charging control circuit receives said working signal through said first contact interface.

11. The charging pad of claim 8, wherein said charging pad comprises a receptacle portion for a plug portion of said wireless receiver to plug thereinto, said receptacle portion being electrically connected to a transmission line.

12. A charging method of the charging pad of claim 8 adapted to a wireless receiver and a rechargeable wireless mouse, said charging method comprising:
  activating, by a charging control circuit of said charging pad, a wireless power transmitting module of said charging pad according to an activation signal provided by said wireless receiver to wirelessly output an electromagnetic power to charge said rechargeable wireless mouse when said charging pad is connected to said wireless receiver; and
  stopping, by said charging control circuit, said wireless power transmitting module from wirelessly outputting the electromagnetic power when said charging pad is not connected to said wireless receiver,
  wherein the step of activating the wireless power transmitting module includes:
    outputting a charging signal to the wireless receiver by the rechargeable wireless mouse placed on the charging pad, and outputting a working signal to the charging control circuit according to the charging signal by the wireless receiver;
    determining whether the rechargeable wireless mouse is placed on the charging pad by determining whether the charging control circuit receives the working signal or not, in response to determine that the rechargeable wireless mouse is not placed on the charging pad by determining the charging control circuit does not receive the working signal, the charging control circuit controls the wireless power transmitting module to intermittently output the electromagnetic power wirelessly such that the charging pad charges the rechargeable wireless mouse in an energy-saving mode, in response to determine that the rechargeable wireless mouse is placed on the charging pad by determining the charging control circuit receives the working signal, the charging control circuit controls the wireless power transmitting module to continuously output the electromagnetic power wirelessly such that the charging pad charges the rechargeable wireless mouse in a working mode.

* * * * *